United States Patent Office 3,809,682
Patented May 7, 1974

3,809,682
POLYETHER AND POLYTHIOETHER FORMATION IN LACTAM SOLVENTS
Josef Studinka, Zurich, and Rudolf Gabler, Uitikon-Waldegg, Switzerland, assignors to Inventa AG fur Forschung und Patentverwertung, Zurich, Switzerland
No Drawing. Filed Apr. 11, 1972, Ser. No. 243,083
Claims priority, application Sweden, Apr. 26, 1971, 6,052/71
Int. Cl. C08g 23/09, 25/00
U.S. Cl. 260—61
15 Claims

ABSTRACT OF THE DISCLOSURE

Polymeric compounds of the formula:

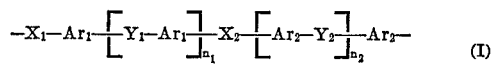
(I)

wherein $X_1$ and $X_2$ are independently either oxygen or sulphur, $Ar_1$ and $Ar_2$ are the same or different aromatic radicals, $n_1$ and $n_2$ are independently of one another the numbers 0–2, and $Y_1$ and $Y_2$ are independently of one another a simple bond or a divalent radicals, particularly one of the series —O—, —CONH—, —S—, —SO$_2$—, —CO—, —CH$_2$—, —C(CH$_3$)$_2$—, —N=N—, in which each Ar is attached to the adjacent ring member by two carbon atoms which are not adjacent one another, and is characterized in that at least one compound of the formula:

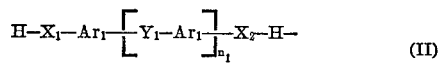
(II)

is treated with at least one compound of the formula:

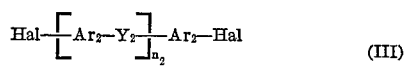
(III)

in which Hal represents halogen, particularly chlorine or bromine, and $X_1$, $X_2$, $Ar_1$, $Ar_2$, $n_1$, $n_2$, $Y_1$ and $Y_2$ have the significance stated in Formula I, in the presence of the quantity necessary for neutralization of hydrogen-halide in particular 1–20% by weight excess calculated on the starting material of an inorganic or organic base as acid acceptor, in a solvent of the formula:

(IV)

in which A is an alkyl radical with 1–4 carbon atoms and m represents the numbers 5–11, and in which the hydrogen atoms of the methylene groups can be wholly or partially substituted by alkyl groups with 1–4 carbon atoms at atmospheric pressure at a temperature of 180–200° C.

---

The present invention concerns a process for the manufacture of polymeric compounds and the polymeric compounds obtained by this process.

Aromatic polyethers and polythioethers possess considerable technical interest on account of their noteworthy heat stability at temperatures between 140 and 200° C., their incombustibility and the ease with which they can be shaped from the melt or from solution.

Manufacture of these polymers normally takes place by treatment of the alkali salt of a divalent aromatic phenol or an aromatic dimercapto compound with an aromatic dihalogen compound in a polar solvent. The processes known up to now are differentiated as to how the alkali salt of the bisphenol or bismercaptan is constituted, the kind of the acid acceptor, and in the chemical nature of the solvent used.

Thus, e.g., in U.S. Pat. No. 2,822,351, a process for the manufacture of aromatic polythioethers is described wherein alcohols are used as polar solvent. In alcohols, however, the polymers formed are insoluble and with small quantities only low molecular weight products are formed.

Another process, according to Dutch patent application No. 6408130, describes the manufacture of aromatic polyethers from bisphenols and dihalogen compounds with the use of an alkali hydroxide as the salt former and dimethyl sulphoxide or cyclic sulphur compounds as the solvent.

These solvents are unstable at temperatures above 140° C., they favor side reactions by their oxidizing action, and, moreover, the azeotropic distillation of the reaction water consequent on the salt formation forms an undesired complication. Aromatic polythioethers were made in a similar way according to U.S. Pat. No. 3,432,468.

Finally, in German Offenlegungsschrift No. 1,957,091, a process was described which by the use of potassium carbonate as a salt former or acid acceptor, the azeotropic removal of water is rendered superfluous. A disadvantage of this process is the long reaction time, on the average 24 hours, and the fact that more than twice the theoretical quantity of potassium carbonate must be used. Cheaper sodium carbonate will not serve in this process.

The ideal, for technical purposes, therefore is a manufacturing process for aromatic polyethers and polythioethers in which the polycondensation can be carried out in a few hours, without use of an azeotropic distillation and with little more than the calculated quantity of sodium carbonate. It has now been found that these three conditions are fulfilled if the polycondensation is carried out in an N-alkylated cyclic amide with 7–13 ring atoms.

The invention therefore concerns a process for the manufacture of polymeric compounds with repeating structural units of the formula:

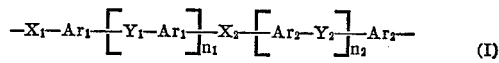
(I)

in which $X_1$ and $X_2$ are independently either oxygen or sulphur, $Ar_1$ and $Ar_2$ are the same or different aromatic radicals, $n_1$ and $n_2$ are independently of one another the numbers 0–2, and $Y_1$ and $Y_2$ are independently of one another a simple bond or a divalent radical, particularly one of the series —O—, —CONH—, —S—, —SO$_2$—, —CO—, —CH$_2$—, —C(CH$_3$)$_2$—, —N=N—, in which each Ar is attached to the adjacent ring member by two carbon atoms which are not adjacent one another, and is characterized in that at least one compound of the formula:

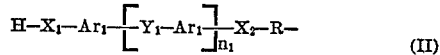
(II)

is treated with at least one compound of the formula

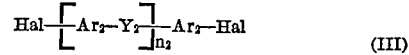
(III)

in which Hal represents halogen, particularly chlorine or bromine, and $X_1$, $X_2$, $Ar_1$, $Ar_2$, $n_1$, $n_2$, $Y_1$ and $Y_2$ have the significance stated in Formula I, in the presence of the quantity necessary for neutralization of hydrogen-halide, in particular 1–20% by weight excess calculated on the starting material of an inorganic or organic base as acid acceptor, in a solvent of the formula:

(IV)

in which A is an alkyl radical with 1–4 carbon atoms and m represents the numbers 5–11, and in which the hydrogen atoms of the methylene groups can be wholly or partially substituted by alkyl groups with 1–4 carbon atoms.

By "aromatic" radicals both isocyclic and heterocyclic radicals are to be understood, of which the isocyclic radicals are preferred. Primarily as aromatic radicals, the 1,3-phenylene and 1,4-phenylene radicals come into question, which may be substituted, e.g., by methyl or ethyl groups or halogen like chlorine or fluorine, however, which are preferably unsubstituted.

Suitable compounds of Formula II are:

Hydroquinone,
Resorcinol,
4-mercaptophenol,
1,3-dimercaptobenzene,
4,4'-dihydroxydiphenyl,
bis-2,2-(4-hydroxyphenyl) propane,
4,4'-dihydroxydiphenyl disulphide,
4,4'-dihydroxydiphenylmethane,
4,4'-dihydroxydiphenyl sulphone,
4,4'-dihydroxybenzophenone
4,4'-dimercaptodiphenyl,
4,4'-dimercaptodiphenyl ether,
4,4'-dimercaptodiphenyl sulphide,
4-mercapto-alpha-naphthol.

4-mercaptophenol and 4,4'-dihydroxydiphenylsulphide are preferred.

Suitable compounds of Formula III are:

1,4-dichlorobenzene,
1,4-dibromobenzene,
4,4'-dichlorodiphenyl,
4,4'-dichlorodiphenylsulphone,
4,4'-dibromodiphenyl ether,
4,4'-dichloroterephthalylphenone,
4,4'-dichloroisophthalylphenone,
N,N'-bis-(4-chlorobenzoyl)-m-phenylenediamine,
N,N'-bis-(4-chlorobenzoyl)-p-phenylenediamine,
4,4'-bis-(4-chlorophenylsulphonyl)-diphenyl,
2,8-bis-(4-chlorophenylsulphonyl)-diphenylene oxide,
1,4-dichloronaphthalene,
2,5-bis-(4-chlorophenyl)-3,4-oxadiazol,
4,4'-dichloroazobenzene.

4,4'-dichlorodiphenylsulphone and 4,4'-bis-(4-chlorophenylsulphonyl)-diphenyl are preferred, particularly the former.

By admixture of two compounds of Formula II and/or two compounds of Formula III, copolymers with greater solubility in organic solvents can be made. Thus, by treatment of a mixture of 4-mercaptophenol and hydroquinone, preferably with a molar ratio of 1 to 1, with 4,4'-dichlorodiphenylsulphone, a polymer with a smaller tendency to crystallize, which is soluble in methylene chloride is obtained.

Preferably the compounds of Formulae II and III are employed in equivalent molar quantities.

As solvents of Formula IV, there may be used, for example:

N-methylcaprolactam
N-ethylcaprolactam
N-isopropylcaprolactam
N-methyl-4-methylcaprolactam
N-methyl-3,3,5-trimethylcaprolactam
N-methyloenanthyllactam
N-methylcaprylyl lactam
N-methylcapryl lactam
N-methyllaurinlactam.

Furthermore, mixtures of these lactams may be used as well as mixtures of isomers, as are formed by Beckmann transformation of unsymmetrically substituted C-alkylated cyclohexa-, -hepta-, and -octanone oximes and subsequent N-alkylation. The preferred solvents are N-methyl and N-ethyl-caprolactam.

The solvents used in accordance with the invention are characterized by an unusually high thermal and chemical stability. Thus, for example, N-methylcaprolactam may be heated for fours with access to air to refluxing temperature (230° C.) without decomposition or discoloration being observed. In this respect, and also in their resistance to acids and alkalies, the N-alkylated lactams with more than 6 ring atoms, considerably surpass the previously used polar aprotic solvents, like dimethylformamide, dimethylacetamide, dimethyl sulphoxide and N-methylpyrrolidone.

As salt formers or acid acceptors, alkalies in the form of hydroxides or carbonates of lithium, sodium or potassium may be used. Sodium carbonate is preferred which is employed in a quantity of 1 mol per mol of dihalogen compound or in an excess of 1–20%. In contrast to a known process which requires potassium carbonate in about twice the quantity, the process according to the invention leads to high molecular weights in the polymers formed, with less and of a cheaper acid acceptor, and in a shorter time. By "high molecular weights" are to be understood such as correspond to a reduced specific viscosity (RSV) of at least 0.4 (measured as 0.2 volume percent solution in chloroform, dimethylformamide or N-methylpyrrolidone at 20° C.) and calculated according to the formula:

$$RSV = \frac{\eta_{rel} - 1}{C}$$

In this $\eta_{rel}$ signifies the relative viscosity and C the concentration in g./100 ml. of solvent.

If, according to the invention, aromatic polythioethers are produced, instead of alkali hydroxides or carbonates, ammonia or organic bases like aliphatic or cycloaliphatic amines may be used as acid acceptors. This variant has the advantage that in the neutralization of the hydrogen halide liberated in the polycondensation reaction, no water is formed requiring removal from the reaction apparatus. As organic bases, such are suitable as have a pK value of 5 at most, e.g., diethylamine, dibutylamine and morpholine. The hydrohalides formed are insoluble in the polycondensation mixture and after completion of the reaction may be removed by filtration. This way of working is particularly suitable for the continuous manufacture of polythioethers which, with the use of ammonia or readily volatile amines, must be carried out under pressure.

The polycondensation takes place in general at atmospheric pressure in an atmosphere of inert protective gas in the temperature range between 100 and 300° C., preferably at 180–200° C. With the use of dihalogen compounds which boil below 180° C., like e.g., p-dichlorobenzene, the polycondensation is preferably effected under small excess pressure of 1–3 atmospheres. The polycondensation is interrupted when the desired RSV-value is attained, which in general is after 2–6 hours. By addition of chain terminators in the form of monofunctional halogen compounds, e.g., ethyl bromide or benzyl chloride, or by use of the dihalogen compound in slight excess of 0.1–2 mol percent, the reaction can be stopped at the desired molecular weight and at the same time the danger of subsequent condensation can be avoided during the working up of the polymers from the melt. After cooling, the product is separated by filtration from the precipitated halogen salt and possibly from excess alkali carbonate and a colorless highly viscous polymer solution is obtained which can be directly used for casting foils, lacquering wires, coating and impregnation of paper and textiles.

The polymers may, however, also be isolated in a solid granular condition, if the filtered solution is injected in filamentous form into water, solidified and granulated. After washing with water and drying at 100–150° C., the aromatic polyethers and polythioethers are obtained in the form of regular cylindrical granules which are suitable for injection molding and extruding in machines of normal construction. The injection molded and extruded articles from the polymers made in accordance with the invention show, so far as no inherent color due to structure is present, a lighter color than that of the artificial materials made according to previously known methods and having the same or similar chemical structure.

The invention is further illustrated by the following examples:

EXAMPLE 1

12.616 g. (0.1 mol) of 4-mercaptophenol, 50.34 g. (0.1 mol) of 4,4'-bis-(4-chlorophenylsulphonyl)-diphenyl and 13.99 g. (0.132 mol) of anhydrous sodium carbonate are introduced into a 250 ml. 3-necked flask provided with stirrer, gas inlet tube, water-separator and cooler and treated with 100 ml. of N-methylcaprolactam. The mixture is heated to 230° C. whilst passing nitrogen through it. From the originally yellow coloured solution, in the course of one hour about 2–3 ml. of water is distilled off. At the same time an increase in the viscosity of the solution is to be observed. The color of the solution becomes yellowish white to white. After 3 hours reaction the sticky liquid polycondensate solution is diluted with 100 ml. of N-methylcaprolactam and freed by filtration under pressure from separated sodium chloride and excess sodium carbonate. The water-clear solution is poured into water, the polycondensate comminuted and boiled several times in water. The white granular product is dried in high vacuum at 140° C. The glass transition temperature of the product is ascertained by different thermal analysis and lies at 245° C.

The reduced specific viscosity of the polymer obtained amounts to 0.94 (measured in N-pyrrolidone 0.2 g. per 100 ml. of solvent). The product is freely soluble in a mixture of 94 volume percent of methylene chloride and 6 volume percent of methanol. From such solutions films of high optical clarity and mechanical stability may be made. Such films retain their high stability even after a heat ageing for 18 months at 180° C. in air.

The polymer can also be worked thermoplastically at temperatures from 280 to 350° C. At 300° C., clear flexible films or moulded articles can be pressed.

EXAMPLE 2

For the polycondensation the apparatus described in Example 1 is used.

11.01 g. (0.1 mol) of hydroquinone, 25.172 g. (0.05 mol) of 4,4' - bis - (4-chlorophenylsulphonyl)-diphenyl, 14.358 g. (0.05 mol) of 4,4'-dichlorodiphenyl sulphone and 13.99 g. (0.132 mol) of anhydrous sodium carbonate are treated with 100 ml. of N-methylcaprolactam. The reaction mixture is heated during 2 hours 30 minutes, to 230° C. A highly viscous reaction mass is formed which is worked up by the method described in Example 1. The isolated and dried product is completely colorless. The reduced specific viscosity amounts to 0.75 (0.2 g.) of substance in 100 ml. of chloroform at 20° C.

The polymer is outstandingly suitable for the production of cast or extruded foils. Cast foils produced from methylene chloride show the following properties.

| | |
|---|---|
| Tear resistance kg./cm.² | 910 |
| Extension percent | 8 |
| Modulus of elasticity kg./cm.² | 30,000 |
| Surface resistivity Ω | $1.3 \times 10^{12}$ |
| Volume resistivity Ω cm | $2 \times 10^{15}$ |
| Relative dielectric constant | 1.9 |
| Loss factor at $10^3$ Hz. | $8 \times 10^{-4}$ |
| Dielectric strength (100μ) kv./cm | 1500 |

EXAMPLE 3

For the polycondensation the apparatus described in Example 1 is used. 23.434 g. (0.1 mol) of diphenylether-4,4' - dithiol, 35.522 g. (0.1 mol) of 4,4' - dichloroterephthalylphenone and 13.99 g. (0.132 mol) of anhydrous sodium carbonate are introduced and treated with 110 ml. of N-methylcaprolactam. The condensation mixture is heated under a nitrogen atmosphere to 180° C. The reaction starts at about 80° C. with evolution of $CO_2$, the solution becomes orange-red at first, later yellowish white, and the viscosity increases even after 1 hour. Stirring is continued for a further hour and the sticky solution then precipitated in water. The granular product is, after boiling with water and subsequent drying in high vacuum at 140° C., somewhat yellowish. The reduced specific viscosity amounts to 0.87 (measured in N-methylpyrrolidine at 20° C., 0.2 g. per 100 ml. of solvent). Differential thermal analysis gives a glass transition temperature of 157° C. and a crystalline melting point of 293° C. Thermogravimetric examination of the polymer shows that decomposition in air begins only at 490° C. (Heating speed 2° C. per minute.)

The product may be worked thermoplastically in the temperature range 270–400° C., wherein by extrusion, tubes, coatings and profiles may be made, and by injection moulding any desired shaped articles.

EXAMPLE 4

Into a 250 ml. glass autoclave provided with a stirrer and gas inlet tube, are introduced 23.434 g. (0.1 mol) of diphenylether-4,4'-dithiol, 7.179 g. (0.025 mol) of 4,4'-dichlorodiphenylsulphone and 37.758 g. (0.075 mol) of 4,4'-bis-(4-chlorophenylsulphonyl)-diphenyl, and treated with 90 ml. of N-ethyl-3,3,5-trimethylcaprolactam. As acid acceptor 25.85 g. (0.2 mol) of di-n-butylamine are added. The autoclave is purged with nitrogen, closed and then heated to 200° C. After a reaction time of 6 hours the solution is colorless and viscous. After cooling the precipitated dibutylamine hydrochloride is removed by filtration whereby a colorless water-clear solution is obtained.

A small test portion of the solution is precipitated in water, the polymer washed and dried. The reduced specific viscosity amounts to 0.57 (measured in chloroform at 20° C., 0.2 g. per 100 ml. of solvent).

The main portion of the filtered solution is used directly for the production of cast foils. These are characterized by high optical clarity, small water uptake and outstanding dimensional stability.

EXAMPLE 5

The procedure is as in Example 4 with the difference that as starting materials, 23.434 g. (0.1 mol) of diphenylether - 4,4' - dithiol and 50.346 g. (0.1 mol) of 4,4'-bis - (4 - chlorophenylsulphonyl)diphenyl are used. As solvent N-ethylcaprolactam is used. After purging with nitrogen the autoclave is filled with ammonia and the pressure maintained constant at 4 atmospheres. The polycondensation is carried out at 180° C. in 5 hours. Working up takes place as described in Example 1.

The reduced specific viscosity of the colorless product obtained amounts to 0.49 (measured in N-methylpyrrolidine at 20° C., 0.2 g. per 100 ml. of solvent).

The glass transition temperature of the polymer, determined by differential thermal analysis, is 245° C., the softening range is 270–290° C. At 300° C., clear, flexible films or moulded articles can be pressed.

EXAMPLE 6

Into the apparatus described in Example 1, 11.415 g. (0.05 mol) of bis - 2,2 - (4 - hydroxyphenyl) - propane and 25.172 g. (0.05 mol) of 4,4' - bis - (4 - chlorophenylsulphonyl) - diphenyl are introduced. 6.995 g. (0.666 mol) of anhydrous sodium carbonate are added and the mixture treated with 50 ml. of N-methylcaprolactam. The contents of the flask are heated to 210° C. and stirred under a nitrogen atmosphere. After 5 hours the condensation mixture is diluted with 100 ml. of N-methylcaprolactam and worked up as is customary.

The reduced specific viscosity of the polymer obtained amounts to 0.63 (measured in chloroform at 20° C., 0.2 g. per 100 ml. of solvent). The product is colorless and can be worked up from solution or thermoplastically.

EXAMPLE 7

The procedure is as in Example 6, with the difference that as acid acceptor 10.75 ml. of aqueous caustic soda (372 mg. per ml., 0.1 mol) is used. The reaction mixture is first heated to 100° C. and a vacuum of 100 torr applied. In the course of 2 hours about 12 ml. of water distills off. Then the temperature is raised to 200° C. and the polycondensation is completed without vacuum in a further 2 hours. Working up takes place as described in Example 1.

The reduced specific viscosity of the colorless product amounts to 0.38 (measured in chloroform at 20° C., 0.2 g. per 100 ml. of solvent.

EXAMPLE 8

In the apparatus described in Example 1, 10.914 g. (0.05 mol) of 4,4'-dihydroxydiphenylsulphide 25.172 g. (0.05 mol) of 4,4' - bis - (4 - chlorophenylsulphonyl)-diphenyl and 6.99 g. (0.666 mol) of sodium carbonate are treated with 60 ml. of N-methylcaprolactam. The polycondensation is carried out at 200° C. in 8 hours. After working up, a granular almost colorless product is obtained, whose reduced specific viscosity amounts to 0.65 (measured in N-methylpyrrolidone at 20° C., 0.2 g. per 100 ml. of solvent.

The polymer can be pressed at 290–310° C., to clear, flexible moulded articles.

EXAMPLE 9

For the polycondensation, the glass autoclave described in Example 4 is used. 23.434 g. (0.1 mol) of diphenylether - 4,4' - dithiol, 23.592 g. (0.1 mol) of 1,4-dibromobenzene and 100 ml. of N-methylcaprolactam are introduced and treated with 21.5 ml. of aqueous caustic soda (372 mg. per ml., 0.2 mol). The mixture is heated under a vacuum of 100 torr in 2 hours to 100° C., during which about 12 ml. of water distills off. Then the vessel is purged with nitrogen and closed. The temperature is raised to 240° C. After 3 hours an increase of viscosity is observed. After cooling the condensation mixture is diluted and worked up as in Example 1.

The polymer obtained has a reduced specific viscosity of 0.45 (measured in N-methylpyrrolidone at 20° C., 0.2 g. per 100 ml. of solvent). The product is freely mouldable at 260° C. Above the glass transition temperature of 94° C., slight crystallization begins. The crystalline melting point is 242° C.

EXAMPLE 10

For the polycondensation the apparatus described in Example 1 is used.

6.308 g. (0.05 mol) of 4-mercaptophenol, 5.505 g. (0.05 mol) of hydroquinone, 28.716 g. (0.1 mol) of 4,4'-dichlorodiphenylsulphone and 13.99 g. (0.132 mol) of anhydrous sodium carbonate are introduced and treated with 75 ml. of N-methylcaprolactam. The polycondensation is carried out with the passage of nitrogen in 2 hours at 230° C. The highly viscous reaction mixture is diluted with 100 ml. of N-methylcaprolactam and filtered. The polymer is isolated from the colorless clear solution by precipitation in water. The reduced specific viscosity of the polymer obtained amounts to 0.72 (measured in N-methylpyrrolidone, 0.2 g. per 100 ml. of solvent). A white granular product is obtained which may be worked thermoplastically very well in the temperature range 270 to 320° C. Injection moulded or extruded shaped parts show an outstanding clarity and good mechanical properties.

EXAMPLE 11

The procedure is as described in Example 1. 17.623 g. (0.1 mol) of 1-hydroxy - 4 - mercaptonaphthalene, 29.114 g. (0.1 mol) of 2,5 - bis - (4 - chlorophenyl) - 3,4 - oxadiazole and 13.99 g. (0.132 mol) of sodium carbonate are introduced and treated with 100 ml. of N-methylcaprolactam. The polycondensation is carried out in 3 hours at 230° C. The sticky liquid reaction mixture is worked up after dilution in the manner described in Example 10. The reduced specific viscosity of the product amounts to 0.48 (measured in N-methylpyrrolidone at 20° C., 0.2 g. (100 ml. of solvent). The granular product may be pressed at 320–350° C. to clear, tough films. Such films show no change in mechanical properties after a heat ageing of 6 months at 200° C. in air.

What is claimed is:
1. In a process for the manufacture of polymeric compounds with repeating structural units of the formula:

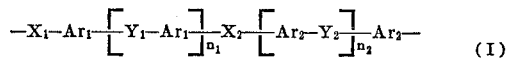

(I)

wherein $X_1$ is an oxygen or sulphur atom,
$X_2$ is an oxygen or sulphur atom,
$Ar_1$ and $Ar_2$ are the same or different aromatic isocyclic radicals,
$n_1$ and $n_2$ are whole numbers between 0 and 2, and
$Y_1$ and $Y_2$ are, independent of each other, a simple bond or a divalent radical,
in which each Ar is connected to its adjacent X and Y members at non-adjacent ring carbon atoms, which comprises treating a first compound having the Formula II as follows:

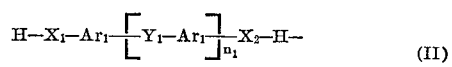

(II)

wherein $X_1$, $X_2$, $Ar_1$, $n_1$ and $Y_2$ are as defined above, with a second compound having the Formula III as follows:

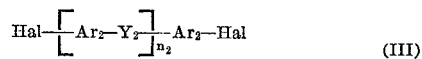

(III)

wherein Hal is a halogen and $Ar_2$, $Y_2$ and $n_2$ are as defined above, in the presence of a sufficient amount of an inorganic or organic base as an acid acceptor, said sufficient amount being that quantity of base necessary to neutralize hydrogen halide which is split off during the treatment, in a solvent: the improvement which comprises said solvent being selected from the class consisting of

(IV)

wherein A is an alkyl radical having 1–4 carbon atoms, N - methyl - 4 - methylcaprolactam, and N-methyl-3,3,5-trimethylcaprolactam.

2. The process as recited in claim 1 wherein $Y_1$ and $Y_2$ are a radical selected from the group consisting of —O—, —CONH—, —S—, —SO$_2$—, —CO—, —CH$_2$—, —C(CH$_3$)$_2$—, and —N=N—.

3. The process as recited in claim 1 wherein Hal in Formula III is chlorine or bromine.

4. The process as recited in claim 1 wherein the base is present in 1–20% excess calculated on the starting material.

5. The process as recited in claim 1 wherein the first compound is 4-mercaptophenol.

6. The process as recited in claim 1 wherein the first compound is 4,4'-dihydroxydiphenylsulphide.

7. The process as recited in claim 1 wherein the first compound is a mixture of 4-mercaptophenol and hydroquinone.

8. The process as recited in claim 1 wherein the second compound is 4,4'-dichlorodiphenylsulphone.

9. The process as recited in claim 1 wherein the acid acceptor is sodium carbonate.

10. The process as recited in claim 1 wherein the acid acceptor is anhydrous ammonia.

11. The process as recited in claim 1 wherein the first compound is selected from the group consisting of:

Hydroquinone,
Resorcinol,
4-mercaptophenol,
1,3-dimercaptobenzene,
4,4'-dihydroxydiphenyl,
bis-2,2-(4-hydroxyphenyl)propane,
4,4'-dihydroxydiphenyl disulphide,
4,4'-dihydroxydiphenylmethane,
4,4'-dihydroxydiphenyl sulphone,
4,4'-dihydroxybenzophenone,
4,4'-dimercaptodiphenyl,
4,4'-dimercaptodiphenyl ether,
4,4'-dimercaptodiphenyl sulphide, and
4-mercapto-alpha-naphthol.

12. A process according to claim 1 wherein A is methyl.

13. A process accordinf to claim 1 wherein $Ar_1$ and $Ar_2$ are each an aromatic radical taken from the class consisting of 1,3 phenylene; 1,4 phenylene; methyl substituted 1,3 phenylene; methyl substituted 1,4 phenylene; ethyl substituted 1,3 phenylene; ethyl substituted 1,4 phenylene; halogenated 1,3 phenylene; halogenated 1,4 phenylene.

14. A process according to claim 1 wherein said second compound is taken from the class consisting of:

1,4-dichlorobenzene,
1,4-dibromobenzene,
4,4'-dichlorodiphenyl,
4,4'-dichlorodiphenylsulphone,
4,4'-dibromodiphenyl ether,
4,4'-dichloroterephthalylphenone,
4,4'-dichloroisophthalylphenone,
N,N'-bis-(4-chlorobenzoyl)-m-phenylenediamine,
N,N'-bis-(4-chlorobenzoyl)-p-phenylenediamine,
4,4'-bis-(4-chlorophenylsulphonyl)-diphenyl,
2,8-bis-(4-chlorophenylsulphonyl)-diphenylene oxide,
1,4-dichloronaphthalene,
2,5-bis-(4-chlorophenyl)-3,4-oxadiazol, and
4,4'-dichloroazobenzene.

15. A process according to claim 1 wherein $Ar_1$ and $Ar_2$ are 1,3 phenylene or 1,4 phenylene.

References Cited
FOREIGN PATENTS

| | | |
|---|---|---|
| 231,062 | 11/1968 | U.S.S.R. |
| 854,315 | 10/1970 | Canada. |
| 1,957,091 | 5/1970 | Belgium. |
| 2,009,323 | 9/1970 | Germany. |

OTHER REFERENCES

Parker: Quart. Rev. 16, 178 (1962).
Parker: Adv. Org. Chem. 5, 3, 20–21, 23, 27 (1965).

MELVIN GOLDSTEIN, Primary Examiner

U.S. Cl. X.R.
260—47 R, 49, 63 R, 63 HA, 79, 79.3